(12) United States Patent
Crossland et al.

(10) Patent No.: US 6,191,834 B1
(45) Date of Patent: *Feb. 20, 2001

(54) LIQUID CRYSTAL CELL

(75) Inventors: William Alden Crossland, Harlow; Anthony Bernard Davey, Bishops Stortford; Vincent Glenn Geake, Thriplow; Ian David Springle, Congleton, all of (GB)

(73) Assignee: Screen Technology Limited, Cambridge (GB)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/091,230
(22) PCT Filed: Jan. 13, 1997
(86) PCT No.: PCT/GB97/00095
  § 371 Date: Oct. 7, 1998
  § 102(e) Date: Oct. 7, 1998
(87) PCT Pub. No.: WO97/25650
  PCT Pub. Date: Jul. 17, 1997

(30) Foreign Application Priority Data

Jan. 11, 1996 (GB) .................................................. 9600595

(51) Int. Cl.[7] .................................................. G02F 1/1335
(52) U.S. Cl. .............................................. 349/71; 349/61
(58) Field of Search ................................. 349/61, 69, 71

(56) References Cited

U.S. PATENT DOCUMENTS

| | | | |
|---|---|---|---|
| 3,811,751 | * 5/1974 | Myer | 349/69 |
| 4,017,157 | * 4/1977 | Van Riet | 349/2 |
| 4,668,049 | * 5/1987 | Canter et al. | 349/71 |
| 4,799,050 | * 1/1989 | Prince et al. | 349/71 |
| 4,822,144 | * 4/1989 | Vriens | 349/71 |

FOREIGN PATENT DOCUMENTS

| | | | |
|---|---|---|---|
| 3301914 | * 7/1984 | (DE) . | |
| 0 185 495 | 6/1986 | (EP) . | |
| 2 615 310 | 11/1988 | (FR) | G09F/9/35 |

OTHER PUBLICATIONS

International Search Report; PCT/GB97/00095 (May 9, 1997).
Patent Abstracts of Japan, vol. 096, No. 002 (Feb. 29, 1996) and JP 07–253576A (Hitachi Ltd), Oct. 3, 1995.

* cited by examiner

Primary Examiner—James A. Dudek
Assistant Examiner—Dung Nguyen
(74) Attorney, Agent, or Firm—Fish & Richardson P.C.

(57) ABSTRACT

A display device includes a shutter layer of liquid-crystal material arranged in cells to shutter input light selectively, a cover layer 5 on the shutter layer, and a set of phosphors 7 on the cover layer, corresponding to the cells, to be activated by the input light and provide the display image. To prevent crosstalk the active cell areas 10 defined by the electrode overlaps are smaller than the corresponding phosphors. This prevents crosstalk between cells even when input light that is not fully collimated is used and also allows space for thicker and/or broader electrodes 12 leading to the cells, reducing resistance, and for other components such as TFTs.

7 Claims, 1 Drawing Sheet

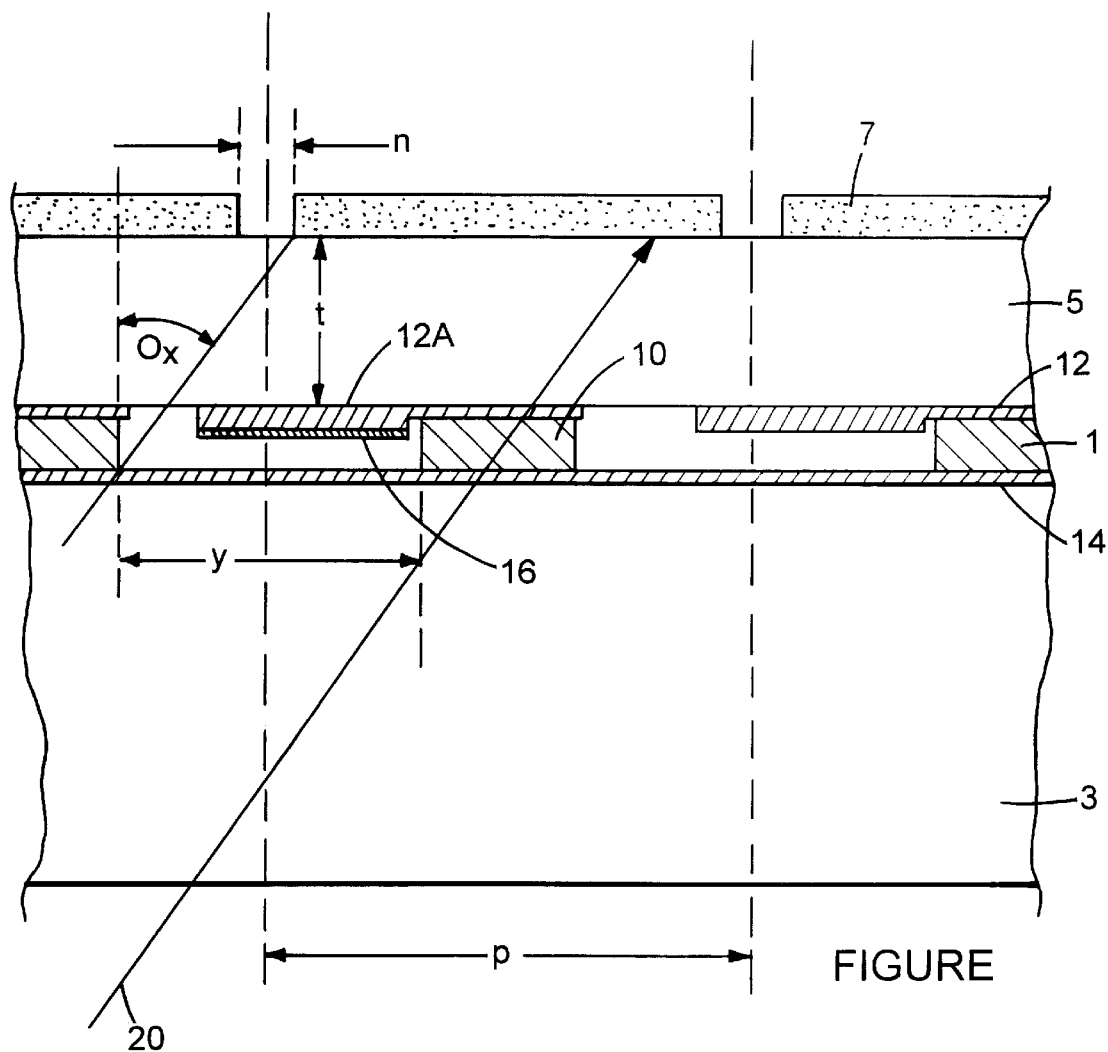
FIGURE

LIQUID CRYSTAL CELL

FIELD OF THE INVENTION

The invention concerns liquid-crystal cell designs, particularly those of the kind used for displays. Specifically the invention is concerned with the kind of device where light at the rear of the cell ("activating light") is directed through a liquid-crystal cell shutter to strike a secondary emitter such as a phosphor, somewhat in the manner of a liquid-crystal analogue to a cathode-ray tube.

BACKGROUND OF THE INVENTION

Liquid-crystal displays of this type are known in principle, for instance, from U.S. Pat. No. 4,668,049 in the name of Stanley Canter. The activating light here is ultraviolet light, and the cells are scattering cells on a light guide in the form of a TIR (total-internal-reflection) substrate. Each cell when not addressed is essentially transparent and does not affect the passage of the ultraviolet light, which therefore remains contained within the light guide so that the corresponding phosphor remains dark. When the cell is addressed it scatters the UV light, some of which therefore escapes the TIR conditions and reaches the phosphors.

Such an arrangement has many advantages, one of which is that narrow-band or monochromatic light can be used as the activating light; this avoids many of the limitations engendered by the wavelength-dependent optical properties of liquid crystals, while making colour displays perfectly possible if the appropriate phosphors are used. Also the viewing-angle problem typical of LC displays is eliminated because the secondary light is emitted by the phosphors and does not have to pass through the liquid-crystal layer.

A problem that nevertheless remains with this kind of display, henceforth photoluminescent LC display or PLLCD, is that to produce an accurate image in the phosphor plane of the image written into the LC cells in the shutter plane, the beam of UV (activating light) emerging from each shutter should be incident solely on the appropriate phosphor. Moreover, in order to maximise the efficiency of this stage of the UVLCD it is also important that the maximum of the beam cross-section is incident on the phosphor (as opposed to on a mask screen between the phosphors, for instance).

EP-A-185495, corresponding to U.S. Pat. No. 4,668,049 mentioned above, purports to address the problem of directing the activating light at the phosphors, namely on page 18 referring to FIG. 5 of that application. However, although various strategies are mentioned, such as reducing the thickness of the front glass and including blocking layers between the pixels, it is clear that a solution has not been found: even with the thinnest glass practicable, say 100–200$\mu$, its thickness would be at least comparable with the spacing of the phosphors, about 200$\mu$ for a high-resolution monitor; since for a scattering device the light supplied must be incident at a shallow angle for total internal reflection to take place in the off-state, it is impossible to prevent scattered light striking adjacent pixels.

An approach to solving this general problem is disclosed in WO 95/27920 (Crossland et al.). This shows the use of means for collimating the activating light between the light source and the liquid crystal, or between the liquid crystal and the phosphors. This approach can solve the problem but involves additional components.

SUMMARY OF THE INVENTION

According to the invention the phosphor includes a border or overlap area all round by which it extends beyond the underlying active area of the liquid crystal. Preferably there is provided a display device including a shutter layer of liquid-crystal material arranged in cells to shutter input light selectively, a cover layer on the shutter layer, and a set of output elements such as phosphors on the cover layer, corresponding to the cells, to be activated by the input light and provide the display image, in which the cells are of substantially smaller area than the phosphors. What is meant here is not the ratio of areas but the requirement that seen normal to the plane the phosphors (or other output elements) have a "border" all round the projection of the active liquid-crystal cell area, i.e. the area defined by the electrodes. This border has to be large enough, in relation to the thickness of the cover glass, to catch all the off-axis input light passing through the cell.

In an aspect, the invention features a display device including a shutter layer of liquid-crystal material arranged in cells to shutter input light selectively, a pair of electrodes in each cell for addressing the liquid crystal to cause the shuttering, the electrodes defining between them an active area, a cover layer on the shutter layer, and a set of output elements on the cover layer, corresponding to the cells, to be activated by the input light and provide the display image. The device further includes a light source offering input light to the device at angles varying over an angular range $\theta$ from the normal. The active liquid-crystal area in each cell lies within the area of the corresponding output element, as seen normally to the cell. The angle $\theta$ approximately satisfies the relation $$\theta = \arctan(y/2t)$$

where y is the spacing between adjacent active areas and t is the thickness of the cover plate.

This relationship greatly reduces the need for collimating the input light or otherwise preventing crosstalk. Although reducing the size of the LC cell reduces the intensity of the display because less input (activating) light can pass through to the phosphors, this disadvantage is outweighed by other advantages, such as being able to use the border space for other components in the liquid-crystal plane; such components might be bus bars for the cell electrodes, and/or TFTs for active arrays.

Other advantages will become apparent from the following description of an embodiment of the invention, in conjunction with the single FIGURE.

BRIEF DESCRIPTION OF THE DRAWING

The single FIGURE (FIG. 1) shows a cross-section through a liquid-crystal cell representing such an embodiment.

DETAILED DESCRIPTION OF THE PREFERRED EMBODIMENT

The liquid-crystal layer 1 is sandwiched between two glass substrates 3 and 5, the lower substrate 3 serving for mechanical support and the upper 5 as a cover, being substantially thinner than the lower substrate. The area of the display is divided in a conventional manner, not illustrated, into a number of cells, one cell being shown and corresponding to the section 10 of the liquid-crystal layer. Each cell further includes a phosphor dot 7 on top of the cover glass 5, each dot extending nearly to the boundary of the cell.

For addressing the individual cells arrays of electrode strips are provided, the upper strips 12 running perpendicular to the paper and the lower 14 running parallel to the upper in the plane of the paper. The electrodes are of transparent material, usually ITO, as is well known.

The liquid crystal can be of any type for the purposes of the invention. If, for instance, it is a TN or STN liquid crystal then the arrangement would also generally include two polarisers, above and below the LC layer, preferably outside their respective glass plates and, in the case of the analyzer, supporting the phosphor dots.

The display operates by modulating input (activating) light 20 arriving from the rear of the screen from a source which is not, or not strongly, collimated. This activating light is preferably monochromatic at, say, 368 nm or of a narrow band of wavelengths suitable for activating the phosphors 7. The input light 20 is modulated by the LC layer 1, in dependence on the voltages applied to the transparent electrodes 12, 14. If the LC cell section 10 allows passage of light then the light reaches the corresponding phosphor 7, which then emits secondary light, usually visible light of a predetermined colour. For colour displays of course three cells would normally be used per pixel, one red, one blue and one green.

As can be seen from FIG. 1, if the incident light 20 can come in at any angle there is a risk that on passing through a cell 10 it will strike an adjacent phosphor 7, which is undesirable. This problem is known as crosstalk. It would be possible to reduce crosstalk by placing the phosphors inside the LC cell, as has been proposed in U.S. Pat. No. 4,830,469 (US Philips Corp.) but it is difficult to construct a practicable device because the phosphors interfere with the electrodes and with the liquid crystal itself. Canter (U.S. Pat. No. 4,668,049 mentioned above) reduces the thickness of the cover glass but this does not fully solve the problem.

Hitherto therefore the only workable solution has been to collimate the incoming light 20. In the arrangement shown in FIG. 1, however, the solution is to make the active part of the liquid-crystal layer 1, i.e. the section 10, considerably smaller in extent or area than the active cell area. Meanwhile the phosphor dot 7 can occupy nearly the whole cell or pixel area. The active cell area is the part which switches when suitable waveforms are applied to the electrodes. It is therefore defined essentially by the overlap of the electrodes 12, 14.

In fact in the embodiment shown the cross-section of the upper electrode 12 is greater than the desired active area shown as the hatched area 10. The reason for this is that the 'surplus' area is being used for a bus bar 12A to reduce electrode resistance. If the bus bar is not opaque then it has to be prevented from acting as a cell electrode; this can be done by coating it with an opaque layer 16, for instance.

Meanwhile, if necessary, the inactive part of the LC layer 1 can be prevented from interfering with the optics simply by occluding the relevant parts with an opaque layer (not shown). With many optical effects, though, the blanking-out happens automatically, namely with those effects for which the unswitched state is the off-state (e.g. parallel polarisers on TN, or cholesteric mirror).

The layout of the cell according to the invention arises from geometrical considerations. The parameters of interest are: phosphor dot pitch p, lateral separation of phosphor dots n, lateral separation of LC cells y, separation of cells and phosphors in the normal direction t. From these it can be shown that:

Maximum off-normal angle $\theta_x$ of incident light for no crosstalk is given by:

$\theta_x = \arctan((y+n)/2t)$;

and

Maximum off-normal angle $\theta_c$ of incident light for 100% efficiency is given by:

$\theta_c = \arctan((y-n)/2t)$.

Thus for best performance, minimise t and maximise y; also to optimise the design bring the two angles together by reducing n.

There are various ways that this can be achieved. In any event it is useful to minimise t, i.e. to use a thick glass for the cell back-glass or substrate to provide the mechanical support, and then use very thin front glass (e.g. microscope slip) purely as containment for the liquid crystal. According to embodiments of the invention, however, one alternatively or additionally maximises y, i.e. makes the active LC shutter a small percentage of the surface area. This has consequent advantages and disadvantages:

the ITO tracks can be more widely separated from each other and hence easier and cheaper to etch, the space between the shutters can be used as substrate for opaque, per-pixel, items (in particular to run conductive busbars to avoid transmission line problems associated with high speed signals running along ITO tracks as mentioned above), but the intensity of light incident on the shutter must be correspondingly higher since a smaller area will be gated through to the phosphor.

In any event it is desirable to minimise n; the separation of the view pixels is limited only by the deposition of phosphors, rather than electrical constraints of ITO tracks.

Adopting these design considerations reduces the required level of collimation which the light incident on the cell must possess in order to render an accurate and bright image in the phosphor. In a specific design the thickness of the front glass and polariser was 1.1 mm, the phosphor separation was 0.1 mm and the pixel pitch was 5 mm, and the input light was collimated to within 20° of the normal.

Applying the constraint for no crosstalk we have $y = 2t \tan \theta - n = 0.7$ mm.

This means that the LC electrodes should be designed to be 4.3 mm square.

Once the active area 10 of the LC layer is made smaller than the cell size or than the size of the phosphor 7 the area in between the LC sections 10 becomes usable for other purposes. One very advantageous use is to provide additional conductive bars to increase the conductivity of the electrode arrays as mentioned above, and moreover these can now be opaque, which assists in blocking unwanted light. Of course, the use of a secondary material complicates the manufacturing process. In the embodiment shown in FIG. 1 the additional conducting material is in fact further ITO adjacent to, and preferably formed in the same step as, the electrode proper; it can usefully be thicker than the electrode part of the ITO layer. If both electrodes 12 and 14 are similarly thickened in between the LC cell sections 10 then the thickened portion can be approaching half the thickness of the LC layer 1, subject to the dielectric strength of the liquid-crystal material.

An alternative or additional use of the space is for forming thin-film transistors (TFTs) for an active display. Normally the use of TFTs involves sacrificing active pixel area, but the invention makes the area available at zero cost. Another advantageous use of the area is for interconnects between the drivers and the liquid crystal. This enables LCs to be tiled seamlessly.

What is claimed is:

1. A display device including a shutter layer of liquid crystal material arranged in cells to shutter input light selectively, a pair of electrodes in each cell for addressing the liquid crystal to cause the shuttering, the electrodes defining between them an active area; a cover layer on the shutter layer, and a set of output elements on the cover layer, corresponding to the cells, to be activated by the input light and provide the display image; the device further including a light source arranged so that the input light is incident on the device at angles varying over a maximum angular range $\theta_x$ from the normal;

in which the active liquid-crystal area in each cell lies within the area of the corresponding output element, as seen normally to the cell; and in which $\theta_x$ approximately satisfies the relation $$\theta_x = \arctan[(y+n/2t)]$$

where y is the spacing between adjacent active areas and t is the thickness of the cover layer and n is the lateral separation of phosphor dots.

2. A display device according to claim 1, in which $\theta_x$ is approximately 20°.

3. A display device according to claim 1, in which further active or passive components are arranged in the spaces between active areas.

4. A display device according to claim 3, in which the electrode in each cell has additional parts extending beyond the active area of liquid crystal within the cell, means being supplied for preventing these additional parts from contributing to the shuttered light output.

5. A display device according to claim 4, in which the electrodes serve the cells in multiplexed fashion.

6. A display device according to any one of claims 3–5, in which the device is supported on a substrate substantially thicker than the cover layer.

7. A display device according to claim 6, in which the said components include thin-film transistors (TFTs).

* * * * *